United States Patent [19]

Rutherford

[11] 4,034,540
[45] July 12, 1977

[54] PORTABLE DUAL SPOOL MICROFILM READING DEVICE

[75] Inventor: Gary J. Rutherford, Atlanta, Ga.

[73] Assignee: Microscroll, Inc., Atlanta, Ga.

[21] Appl. No.: 597,041

[22] Filed: July 18, 1975

[51] Int. Cl.² .................................... G09F 11/24
[52] U.S. Cl. .............................. 40/86 A; 40/106.1
[58] Field of Search ......... 40/86 R, 86 A, 96, 96.5, 40/106.1; 350/235-241

[56] References Cited

U.S. PATENT DOCUMENTS

| | | | |
|---|---|---|---|
| 2,787,070 | 4/1957 | Idoine | 40/86 R |
| 3,229,396 | 1/1966 | Shaw | 40/86 A |
| 3,557,476 | 1/1971 | Kalb | 40/86 A X |

FOREIGN PATENT DOCUMENTS

| 462,770 | 7/1928 | Germany | 40/86 R |
|---|---|---|---|

Primary Examiner—John F. Pitrelli
Attorney, Agent, or Firm—Beveridge, DeGrandi, Kline & Lunsford

[57] ABSTRACT

A portable dual spool cassette type microfilm reading device capable of storing a large quantity of microphotographic information in a relatively small space. The cassette contains a band of microfilm having information frames disposed in rows and columns thereon and windable from one spool to the other in the cassette. The cassette has a track which extends in the column direction of the microfilm and on which a direct view type microfilm viewer is mounted for movement. To access a column for a particular frame a manually operable knob is operated to wind the film on the spools to the column position and to locate the row the viewer is moved in the track to the row position.

4 Claims, 13 Drawing Figures

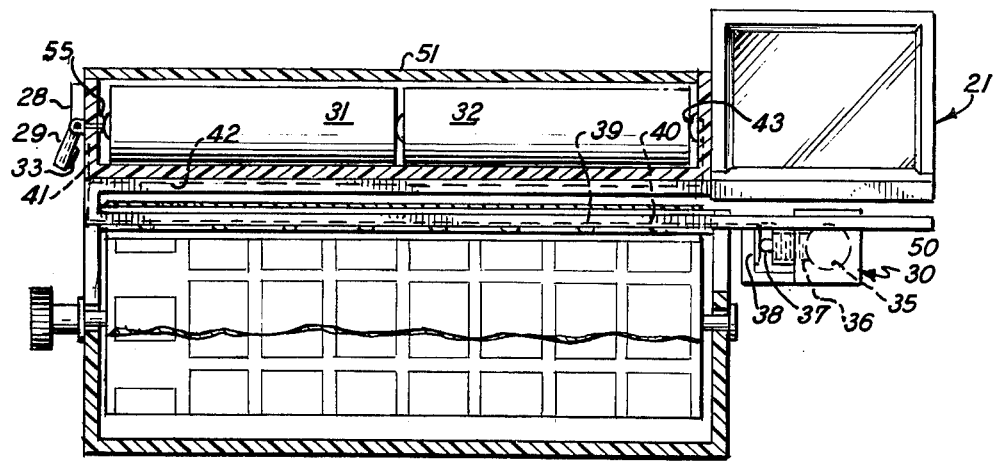
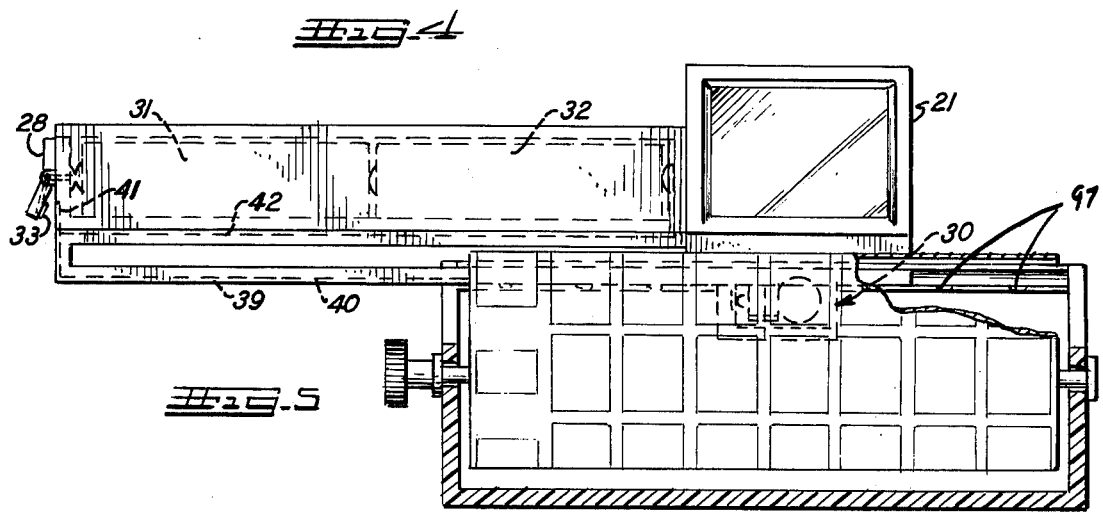
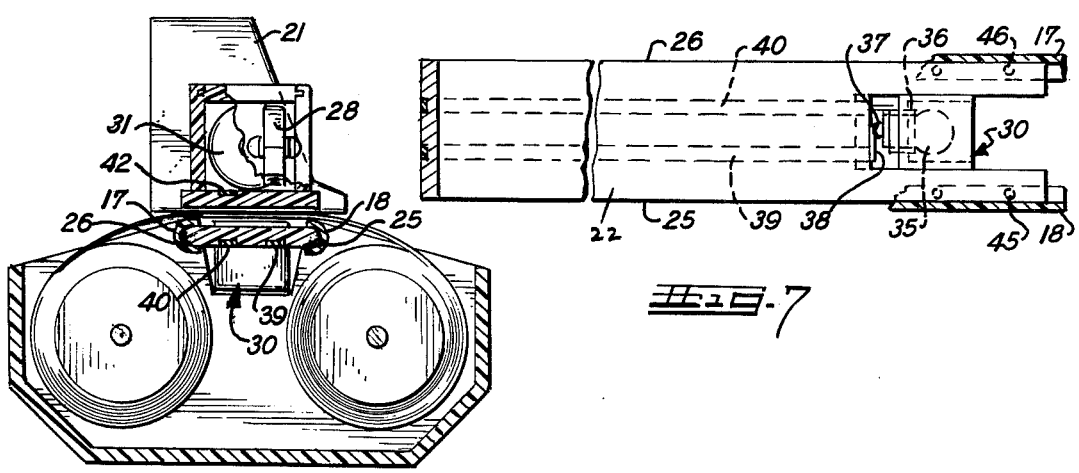

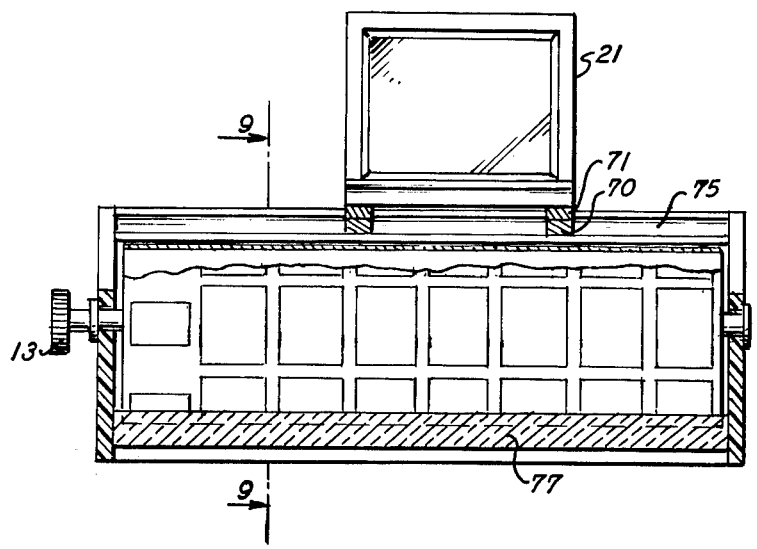
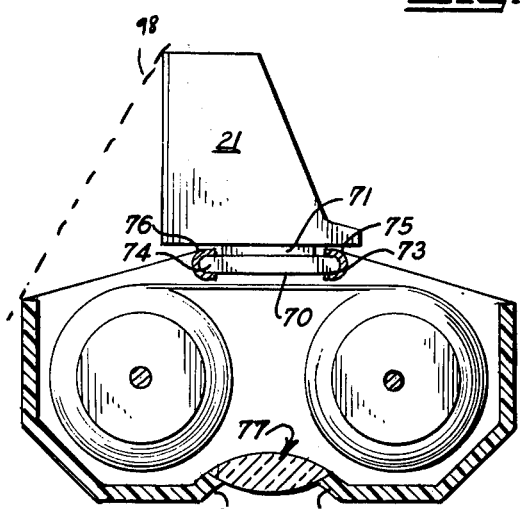
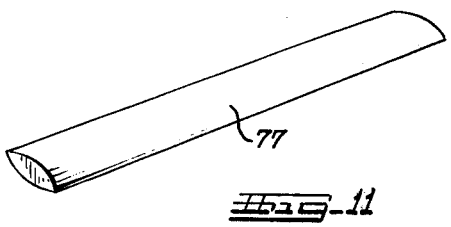
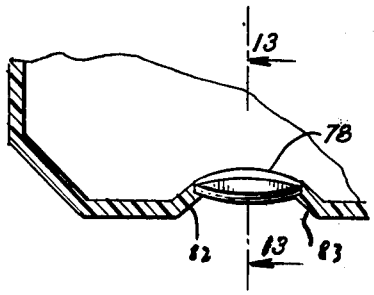
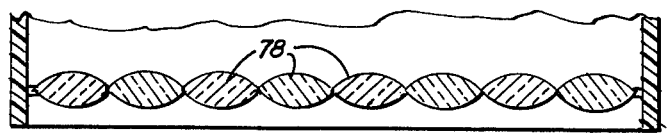

PORTABLE DUAL SPOOL MICROFILM READING DEVICE

The present invention relates to an improved portable microfilm reading device which is capable of storing extremely large quantities of information.

In recent years the use of microfilm and microfiche as a storage and retrieval medium for visual images has become widespread. The salient advantage of microfilm and microfiche is that vast quantities of visual information can be stored in an extremely small area.

While most of the commercial readers for microfilm or microfiche have been table or desk models intended for semipermanent installation, it is apparent that a completely portable and preferably a hand-held reading device would be desirable. The uses for such a portable reading device, especially if it is capable of storing large quantities of information, would be manifold. For instance, traveling salesmen would not have to carry bulky catalogues and instruction manuals but rather could carry a portable viewer with the appropriate cassette. Similarly, instead of telephone operators having to leaf through the pages of a bulky telephone book or books, all of the information for a given dialing area could be stored in a portable reading device and accessed manually.

While portable reading devices have been known in the prior art, most of them have suffered from the disadvantages of being too bulky, too expensive, and not having the ability to store large enough quantities of information. Thus, most of the portable reading devices of the prior art have been of the optical projection type which requires relatively bulky and expensive optical components and a relatively large viewing screen. This type of reading device is usually too large to be hand held.

The prior art disadvantage of not being able to store large enough quantities of information arises primarily from the fact that prior art devices read either strip microfilm, in which a 16 mm-wide strip of microfilm having a single row of serial microphotographic frames disposed thereon is utilized or "aperture card" microfiche in which a 105 mm-wide sheet of microfiche mounted in a 4 inch × 6 inch aperture card is utilized. As is apparent, with the strip microfilm arrangement the amount of information which can be stored at any one time is limited by the thickness of the reel, which must be relatively small by prescribed space considerations. With the aperture card microfiche arrangement a system is capable of storing only the even smaller amount of information contained on a single aperture card.

According to the present invention, a much greater quantity of information can be stored in a relatively compact space by providing a dual spool microfilm cassette utilizing a band of microfilm having information frames disposed in rows and columns thereon as in the microfiche aperture card arrangement above, but also windable from one spool to the other in the cassette as in the reel arrangement above. Thus the storage capability advantages of both the aperture card microfiche and the strip microfilm systems are obtained.

According to the device of the present invention, the cassette, which is compact enough to be hand held, has a manually operable means for winding the microfilm in the row direction thereof from one spool to the other. The cassette further has a track means affixed thereto or formed integral therewith which extends in the column direction of the microfilm. The track means is adapted for accommodating a mounting means for a direct viewtype microfilm viewing device or reader which is mounted so that it can be moved along the track in the column direction of the microfilm.

In order to access a desired frame of information the manually operable means is operated to wind the microfilm so that the column of the desired frame is at the viewing area and the direct view type reader is moved along the track means in the column direction until it overlies the desired frame. This is in distinction to portable aperture card microfiche reading devices of the prior art wherein the optics were held stationary and the microfiche was moved in mutually perpendicular directions to access the desired frame.

It is thus an object of the invention to provide a microfilm reading device which is extremely portable but which still has the capability of storing an extremely large quantity of microphotographic information.

It is a further object of the invention to provide a microfilm reading device which is hand held.

It is still a further object of the invention to provide a microfilm reading device in which a desired frame of information can be quickly and readily accessed.

It is still a further object of the invention to provide a microfilm cassette capable of storing an extremely large amount of microphotographic information in a compact area.

It is still a further object of the invention to provide a shell for a microfilm cassette capable of storing an extremely large quantity of microphotographic information in a compact area.

The invention will be better understood by referring to the embodiment illustrated in the drawings in which:

FIG. 5 is a lengthwise cross-sectional view with the mounting means and viewer displaced from the position shown in FIG. 4.

FIG. 6 is an end elevational view of the device, partly in section.

FIG. 7 is a plan view of member 22.

FIG. 8 shows a width-wise portion of microfilm having an indexing row at each edge.

FIG. 9 and 10 are lengthwise and end views respectively of a further embodiment of the invention.

FIG. 11 is a perspective view of a linear lens utilized in the embodiment of FIGS. 9 and 10.

FIGS. 12 and 13 show a further embodiment of the invention utilizing a plurality of individual lenses.

Figures 1, 2:
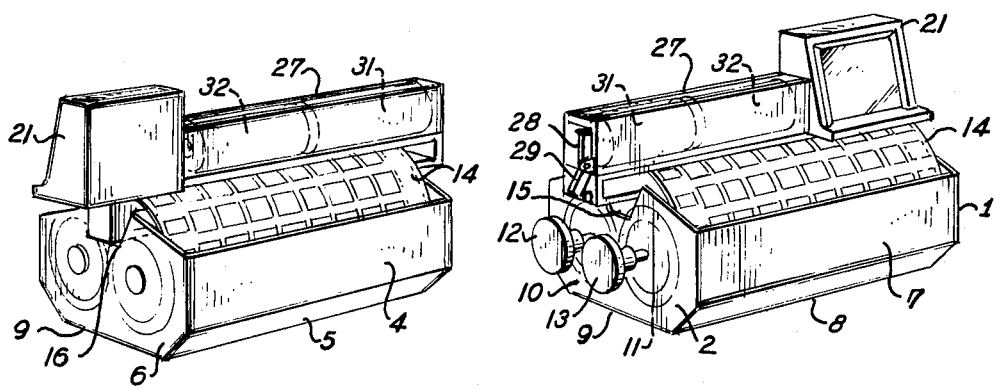
FIG. 1 is a perspective view of the reading device.
FIG. 2 is a perspective view of the device taken from the opposite side as FIG. 1.
Figure 3:
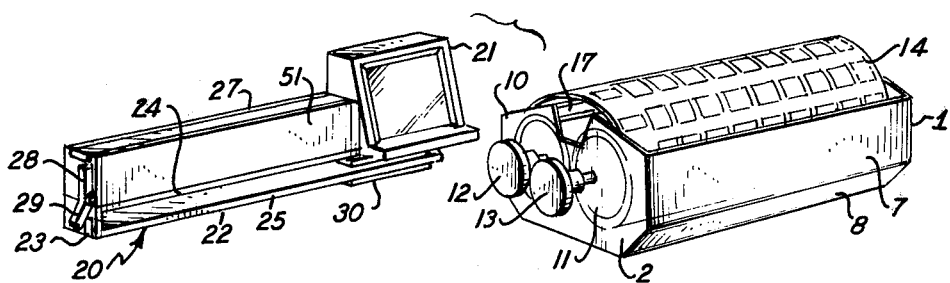
FIG. 3 is an exploded perspective view of the device.

An illustrative embodiment of the microfilm cassette of the invention is shown in FIGS. 1, 2, and 3. The cassette is comprised of shell 1 having spools 10 and 11, which carry the microfilm band 14, for rotation thereon. The microfilm may be advanced in either direction by manually rotating knobs 12 or 13, each one of which winds the microfilm onto the spool to which it is connected. The microfilm has microphotographic information disposed thereon in frames which are located in a plurality of parallel rows. In the particular embodiment illustrated nine information rows are shown and additionally one or more indexing rows may be provided as described in conjunction with FIG. 8.

In an actual device which was built the band of microfilm utilized was 105 mm wide and 5 mil thick. Using this microfilm in a cassette small enough to be hand-held, it was possible to store the majority of the Atlanta telephone directory, the largest toll free area in the world, in the cassette. As pointed out above, this storage capacity is far greater than would be attainable with either a reel type microfilm system or an aperture card type system. The amount of information that can be stored depends solely on the size of the cassette and the thickness of the film within the cassette. If a thinner film were utilized, an even greater amount of information could be stored. Further, it should be appreciated that while the above discussion referred to a device having nine information rows of microphotographic frames and using a strip of microfilm 105 mm wide, any arbitrary number of rows and width of microfilm could be used.

The shell of the cassette can be made of any rigid material, for example polyvinylchloride and preferably is transparent. As shown in FIGS. 1, 2, and 3 spools 10 and 11 are rotatably mounted between ends 2 and 6 of the shell. The rotatable mounting may be effected by any mechanical means known to those skilled in the art. For instance ends 2 and 6 may have holes therein and the spools may have central axle members which are disposed in the holes. In FIGS. 1 and 3, knobs 12 and 13 are shown secured to the axle members for rotating them. Additionally, in the embodiment shown the cassette is comprised of ends 2 and 6, sides 4, 5, 7 and 8 and bottom face 9. This particular construction of the cassette is exemplary only and it is to be understood that the specific construction may be varied and still be within the scope of the invention. For instance, if desired sides 5 and 8 may not be used and bottom face 9 may be extended to join extended sides 4 and 7 at right angles.

Each of ends 2 and 6 has a channel, 15 and 16, respectively, cut therein. The purpose of these channels and the elongated channel area formed therebetween across the width of the cassette is to accommodate an illumination means for the viewing device, as will be explained in greater detail below.

In order to movably accommodate a direct view-type microfilm viewing device, the cassette shell has a track means. The track means is located above the microfilm rolls so as there is no mechanical interference between the rolls and the track means 17, 18 in the form of two U-shaped rails is shown symmetrically disposed with respect to the mid-line of the cassette (also see FIG. 3). As indicated above, the purpose of the track means is to movably carry the optics of the device along the column direction of the microfilm over the viewing area. The viewing area need not be located at the center of the cassette as shown and the track means could be located differently also, so long as the mechanical arrangement is such to make the viewing device movable over the viewing area.

FIGS. 1 and 2 show the composite reading device with the viewing device mounted on the cassette. The direct view-type microfilm viewer is chosen or arranged to have a field of view corresponding to one microphotographic frame. An optical system which has been found to be particularly suitable for the viewer is described in U.S. Pat. No. 3,758,196 and that patent is incorporated herein by reference.

The viewer 21, illumination assembly 30, and battery pack 27 are mounted on mounting means 20 which is slidably moveable on the cassette and which is shown in the exploded perspective view of FIG. 3. Mounting means 20 comprises a rigid member made up of portions 22, 23 and 24 which together comprise a member in the shape of an elongated U. This member may be made of plastic or other rigid material. The direct view-type microfilm reader 21 is secured by gluing or other suitable fastening to the front of portion 24 directly above the illumination assembly 30 which is secured to the front of portion 22. In one construction, as shown in FIG. 7 the front of portion 22 is forked and illumination assembly 30 is inside the fork.

Figure 4:
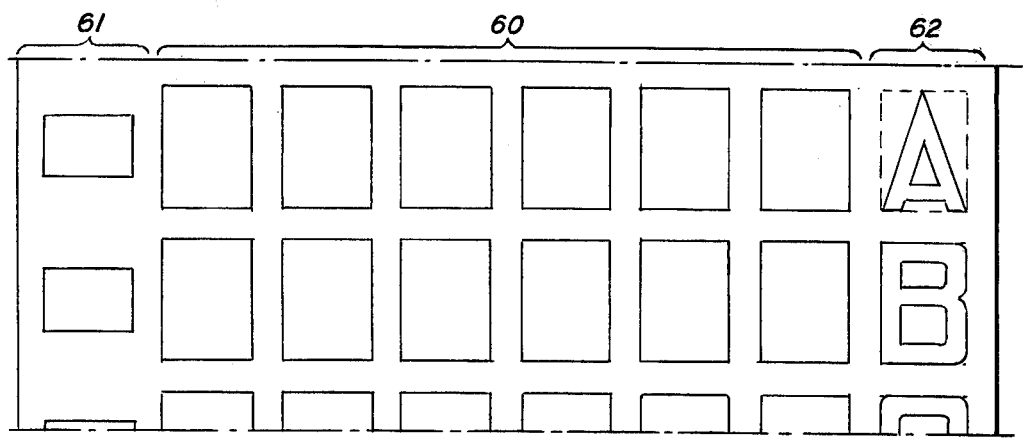
FIG. 4 is a lengthwise cross-sectional view of the device.

Battery pack assembly 27 is mounted on top of member 24 and as shown in FIG. 4 preferably comprises a transparent housing 51 which houses two penlight cells 31 and 32. Although not shown, housing 51 should be arranged to provide ready access to the batteries for testing and changing thereof. Any mechanical arrangement known to those skilled in the art may be used for this purpose. For instance, one of the lower edges of housing 51 may be friction fitted inside of a lip with the other lower edge being hinged so that the housing may pivot in and out of the lip when a force is applied thereto.

Illumination assembly 30 as shown in FIG. 4 is comprised of bulb 35 around which is disposed diffuser 30 to insure that the light incident on the viewer is somewhat diffused. The side conductive portion of the bulb 36 is connected to contact 43 inside of the battery pack assembly by conductive strip or wire 40, 42 (also see FIG. 6) which runs along the underside of member 22 and then along the top side of member 24 to conductor 43. The circuit is completed through battery pack assembly contact 55, toggle switch 28, contact 33 thereof, and conductive strip or wire 41, 39 which runs along the outside of member 23 and the underside of member 22 back to contact 38 which is in contact with tip 37 of bulb 35. Hence when the lower portion of toggle switch 28 is depressed contact is made between contact 33 and conductive strip 41, the circuit is completed, and the bulb lights.

As indicated above the cassette has substantially U-shaped rails 17 and 18 running along the long dimension of central channel area 15, 16. Referring to FIG. 3, the mounting means and cassette are assembled by sliding member 22 of the mounting means into the central channel area so that elongated edges 25 and 26 of member 22 fit into U-shaped grooves 18 and 17 respectively. The mounting means may be moved in the grooves to select the proper frame for viewing by an operator by gripping battery pack assembly 27 and moving it in either one direction or the other whereupon member 22 slides in the U-shaped grooves and moves the viewer 21. Mechanical stop means are provided for each row so that the viewer may be stopped at exactly the right position for viewing. Exemplary mechanical stop means comprise indentations 97 in tracks 17 and 18 adjacent each microfilm row which cooperate with projections 45 and 46 on the bottom of the forked front portion of member 22, for providing a rest position for the viewer adjacent each row position.

As indicated above the microfilm may contain one or more indexing rows. A preferred embodiment of the film is shown in FIG. 8 wherein indexing rows 61 and 62 are located at each edge of the film on respective sides of the information rows 60. In this arrangement row 61 would contain microphotographic indexing information while row 62 would comprise a more gross type of indexing information which would be visible to the naked eye. For instance in FIG. 8 while row 62 utilizes letters row 61 might contain more detailed classifications within the letters.

FIGS. 9 to 13 show further embodiments of the reading device of the invention, which do not use an artificial source of illumination. In the emboidment shown in FIGS. 9 and 10 the ambient light is augmented by linear lens 77, mounted in channel 82, 83 and shown in perspective in FIG. 11.

Since the illumination means is dispensed with the microfilm need not pass over the track means as in the embodiment of FIGS. 1 to 7. The direct view-type reader is mounted on member 70 which may merely be an elongated substantially rectangular member having edges 74 and 73 which slide in tracks 76 and 75. To allow the reader to pass over the tracks, a spacing member 71 of small clearance dimension is utilized.

In the embodiment shown in FIGS. 12 and 13, instead of utilizing a linear lens, an individual lens element 78 corresponding to each frame row is mounted in channel 82, 83.

If the ambient light is not sufficient to provide for suitable viewing a "clip-on" lamp below the linear lens or plurality of lenses may be used. In the alternative a fiber optics light rod may be utilized as a clip-on unit to the optical unit, traveling with it, immediately under the film plane.

The embodiment of FIG. 10 may be contained in a casing which will allow the device to rest in plane 98. This would allow the device to be picked up and viewed directly by the user as well as protecting the optical parts from damage.

It is to be noted that the term "microfilm" as used in this application encompasses any information-carrying medium containing information which must be enlarged for viewing, whether made viewable by transmitted or reflected light.

Further, while I have described an illustrative embodiment of my invention, I wish it to be understood that I do not intend to be restricted solely thereto, but that I do intend to cover all modifications thereof which would be apparent to one skilled in the art and which come within the spirit and scope of my invention.

What is claimed is:

1. A portable cassette reading device for reading microfilm having microphotographic images disposed thereon in frames located in rows and columns on said microfilm and for accessing any desired frame; comprising,
    a roll microfilm cassette manufactured having two rotatable spools with said microfilm would thereon, said cassette including manually operated means for winding said microfilm from one spool to the other in the row direction and track means running parallel to said spools in the column direction, a viewing area being located intermediate said spools adjacent to the front surface of said microfilm and running in the column direction,
    a direct view-type microfilm reader, and
    mounting means, removable from said cassette, for mounting said direct view-type microfilm reader on said track means for movement over and along said viewing area, said mounting means including means for mounting a lamp at a position behind the rear surface of said microfilm for illuminating the same frame as said reader is viewing and for movement with said reader, whereby any desired frame may be accessed by operating said means for winding to access a column of the desired frame and by moving said direct view-type microfilm reader and said lamp on said track means to access the row of the desired frame.

2. The reading device of claim 1 wherein said cassette has a channel therein running in the column direction immediately behind the rear surface of said microfilm and directly behind said viewing area, said track means comprising a pair of rails running along said channel, and said mounting means including means slidably mounted in said rails and supporting the lamp in said channel so that it is opposite said reader, said cassette having two end walls, one at each end of said spools, and the ends of said channel being cut into both end walls.

3. The reading device of claim 2 wherein said mounting means comprises a member having an elongated lower runner portion having two longitudinally extending edges slidably mounted in said pair of rails, and an upper elongated support bar portion overlying but spaced from said lower runner portion, one longitudinal end of said lower portion being connected to the respective end of said upper portion, said lamp being mounted at the other end of said lower portion, and said reader being mounted at the other end of said upper portion.

4. The reading device of claim 3 wherein said upper portion carries a battery housing.

* * * * *